United States Patent [19]
Rioux

[11] Patent Number: 4,787,748
[45] Date of Patent: Nov. 29, 1988

[54] SYNCHRONOUS OPTICAL SCANNING APPARATUS

[75] Inventor: Marc Rioux, Ottawa, Canada

[73] Assignee: Canadian Patents and Development Limited, Ottawa, Canada

[21] Appl. No.: 46,391

[22] Filed: May 6, 1987

[51] Int. Cl.$^4$ .................. G01C 3/00; G01B 11/24
[52] U.S. Cl. ................................ 356/376; 350/6.7; 356/1
[58] Field of Search ............. 356/1, 375, 376, 431; 250/563; 350/6.5, 6.7, 6.8, 6.9, 6.91, 412

[56] References Cited

U.S. PATENT DOCUMENTS 3,881,801  5/1975  Bechtold .................. 350/412 X
4,627,734 12/1986  Rioux ........................... 356/376

Primary Examiner—F. L. Evans
Attorney, Agent, or Firm—Yoshiharu Toyooka

[57] ABSTRACT

A triangular, synchronous optical scanning apparatus to be used in a three-dimensional imaging is disclosed. A pair of curved stationary reflecting mirrors can be provided in optical beam paths to modify the reference plane to conform to the target surface.

10 Claims, 3 Drawing Sheets

SYNCHRONOUS OPTICAL SCANNING APPARATUS

The present invention relates in general to a three dimensional imaging apparatus and in particular to improvement to a synchronous optical scanning apparatus.

BACKGROUND OF THE INVENTION

A device for acquiring three dimensional data of a target surface or other object is very essential for target recognition in variety of fields e.g. robotics, IC inspection etc. Such a device can transmit the acquired three dimensional data to other instruments for tool manipulation, data inputting to computers for their analytical judgement etc.

A number of techniques have been used in the past to generate three dimensional information and a few typical ones are stereo vision, laser radar and triangulation technique. The stereo vision requires accurate opto-mechanical alignment and complex data computation, resulting in slow response, low sensitivity and resolution etc. The laser radar technique makes use of the time-of-flight measurement of an optical pulse. Because it requires better than 0.1 pico seconds of time delay resolution to measure the height of 0.001" in indoor applications. The system is at present far from practical.

Triangulation, on the other hand, is perceived as the best overall performance method for variety of applications. Among the triangulation techniques, a three dimensional raster scanned technique has shown excellent results. U.S. Pat. No. 4,627,734 Dec. 9, 1986 Rioux describes such optical three dimensional imaging system utilizing a laser scanner with a synchronously scanned position sensitive detector. In the patented system, the projected beam and the detected beam are scanned synchronously so that the detected position in the position sensitive detector remains unchanged when the beams scan a reference surface, the shape and location of which are uniquely determined by the optical parameters of the system. The distance of the detector from the reference surface can be set arbitrarily. The detected position in the detector only changes when the beam is reflected from a surface point that is either nearer to or further from the reference surface.

Similar synchronous scanning techniques are disclosed in U.S. Pat. No. 4,171,917 Oct. 23, 1979 Pirlet. The patent uses a pair of synchronously rotating polygonal mirrors, one for scanning the projected beam and another for receiving the scattered beam, for determining the profile of a surface of an object.

U.S. Pat. No. 4,170,398 Oct. 9, 1979, Koester discloses another triangulation technique which employs a pair of synchronously rotating flat mirrors to scan the surface and to detect scattered beam. The sanning technique of the patent is for scanning microscope and in particular for viewing biological tissues at varied angles.

One of the common problems of the triangulation process is its non-linearity along the scanning line in that the reference surface with respect to which the height of the target surface is measured is not planar but rather spherical, cylindrical or other curved surface, depending upon the optical arrangement of the system used.

The present invention as one of its applications obviates such non-linearity by the use of unique optical configurations.

It should also be noted that U.S. Pat. No. 4,009,829 July 11, 1978, Sraayer suggests the use of a single converging meniscus lens in the optical path between the scanner and the flat field surface focussing the diverging light beam as a point at all locations on the flat field. Of course, this optical arrangement is not a synchronous scanning and only the focussing of the projected scanning beam is considered. While this avenue has been tried for synchronous scanning it has been shown to be impractical.

OBJECTS OF THE INVENTION

It is therefore an object of the present invention to provide a synchronous optical scanning apparatus in which the reference plane can be made to fit closely the target surface.

It is another object of the present invention to provide a synchronous optical scanning apparatus in which the reference plane is planar.

SUMMARY OF THE INVENTION

Briefly stated, the present invention resides in an imaging device for determining the profile of a surface in a direction relative to a reference plane. In particular a synchronous optical scanning apparatus of the present invention comprises rotating scanning means which includes two or more rotating mirrors for synchronously scanning the surface along a scanning line by scanning light beam and receiving a scanned beam scattered back from the surface. The apparatus further comprises a pair of reflecting mirrors, one in each of the optical paths of the scanning light beam and the scattered scanned beam. The reflecting mirrors are curved.

BRIEF DESCRIPTION OF THE DRAWINGS

In a more complete understanding of the present invention and for further objects and advantages thereof, references may be made to the following description taken in conjunction with the accompanying drawings in which.

DETAILED DESCRIPTION OF PREFERRED EMBODIMENTS

Reference is now made to the article authored by the inventor of the present application "Laser Range Finder based on Synchronized Scanners", Applied Optics Vol. 23, No. 21, Nov. 1, 1984 pp 3837–3844. The article analyzes in detail the geometry of the triangulation techniques including synchronized scanning.

Figure 1:
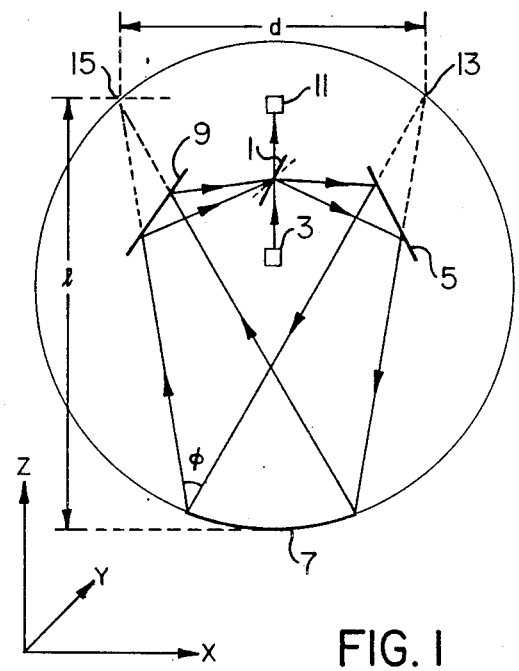
FIG. 1 is an optical diagram of a synchronous scanning according to prior art.

FIG. 1 is a diagrammatic drawing of the optical arrangement, in (X-Z) plane of the cartesian coordinate system, of the synchronized scanning according to one embodiment of the invention using a pair of flat mirrors. A target surface to be monitored is in (X-Y) plane. A flat mirror 1 which has a reflecting surface on the both sides rotates about its axis parallel to the Y axis. A light source 3 projects a beam of light toward the rotating mirror 1 which reflects toward a flat stationary mirror 5. As the rotating mirror 1 rotates, the beam of light reflected from the stationary mirror 5 scans a reference plane 7. The scattered light from the reference plane 7 is relected by another stationary mirror 9 back toward the rotating mirror 1 which directs the beam of the scattered light to a position sensitive detector 11. Apparent locations of the rotating mirror are indicated at 13 and 15.

As discussed in the above-reference article, in the optical geometry shown in FIG. 1, the reference plane (the trajectory in (X-Z) plane of the scanning beam and the scanned scattered beam) is a circle which includes in its circumference the two apparent locations of the rotating mirror. The diameter of the circle is expressed as $$\frac{l^2 + d^2/4}{l}$$

where d is the distance between the apparent locations of the rotating mirror and l the distance along the Z axis between the apparent locations and the reference plane. Stated in other words, the radius R of the curvature of the reference plane is expressed as $$R = \frac{l^2 + d^2/4}{2l}.$$

It is therefore clear that when a relatively flat object is synchronously scanned e.g. as in the printed circuit board inspection, a larger number of resolving elements than desired is needed. Ideally, a single element would be used for a flat area.

It should be noted that scanning in Y direction can be linear by parallel beams or angularly linear by radially scanning beam. In the former case, the reference plane is a cylindrical surface and the latter, it forms a spherical surface. It is therefore to be noted that for spherical and cylindrical surface inspection, it would be advantageous to use such reference planes.

Figure 2:
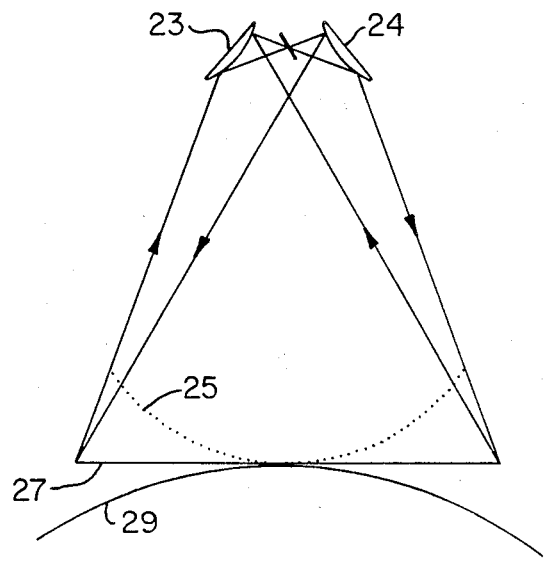
FIG. 2 is an optical schematic diagram of the synchronous scanning according to one embodiment of the present invention.

Referring to FIG. 2, a diagrammatic illustration of an optical arrangement according to one embodiment of the present invention. A pair of stationary flat mirrors 5 and 9 of FIG. 1 are replaced by a pair of spherical or cylindrical mirrors 23 and 24. A dotted line 25 indicates a cylindrical or spherical reference plane when a pair of flat stationary mirrors are used. As we decrease the radius of curvature R of the stationary reflecting mirrors from a flat surface (R being infinite), the diameter of the cylindrically (or spherically) shaped reference plane increases. At some point $R=R_o$, there is an infinite radius for the reference plane which provide a flat surface designated by 27. If we continue to decrease the radius of curvature of the reflecting mirrors below $R_o$, then the diameter of the cylinder becomes negative as shown by 29 in the figure.

It should also be noted that as we decrease the radius of curvature R of the mirrors, the field of view increases as can be seen in FIG. 2.

Figure 3:
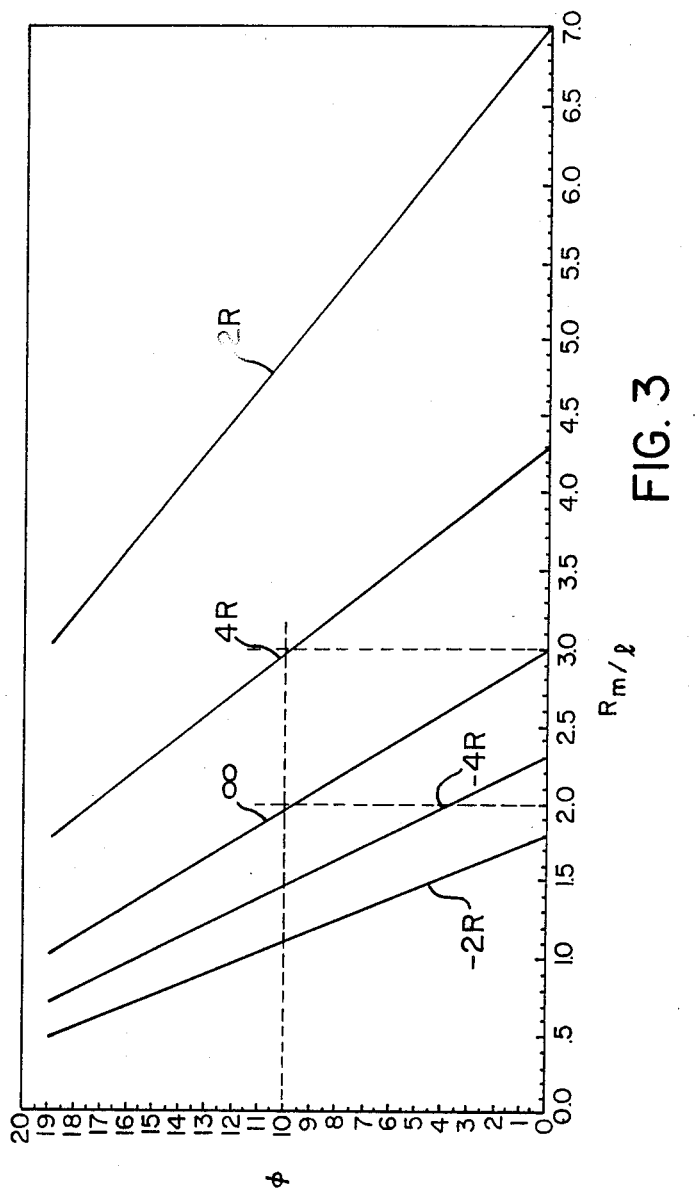
FIG. 3 is a graph showing the relationship among the angle of optical axes of light beams, the curvature of the stationary reflecting mirrors and the curvature of the reference plane.

FIG. 3 is a graph showing the relationship among the angle of optical axes, the curvature of that stationary reflecting mirrors and the curvature of the reference plane. The graph has been produced using a ray tracing program. In the graph, $\phi$ is an angle at the intersection of the optical axes for the scanning light beam and the scanned scattered beam. Rm is the radius of the curvature of the reflecting stationary mirrors, 1, the distance along the Z axis between the apparent locations of the rotating mirror and the reference plane and R, the radius of the curvature of the reference plane.

As seen in the graph, $\phi = 10°$ (typical value for many applications) and $Rm/1 = 2.0$ produce a flat reference plane as indicated by the line designated $\infty$ ($R = \infty$).

A slightly convex reference plane (4R) is produced when $\phi = 10°$ and $Rm/1 = 3.0$.

It is clear therefore that depending upon the requirements of certain applications, it is advantageous to have the reference plane designed to fit the target surface as closely as possible to reduce the number of resolving elements.

Figure 6:
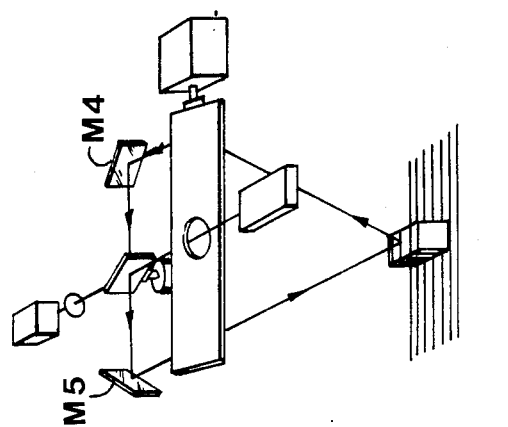
FIG. 6 is a schematic illustration of the synchronous scanning according to yet another embodiment to which the present invention can be applied.
Figure 5:
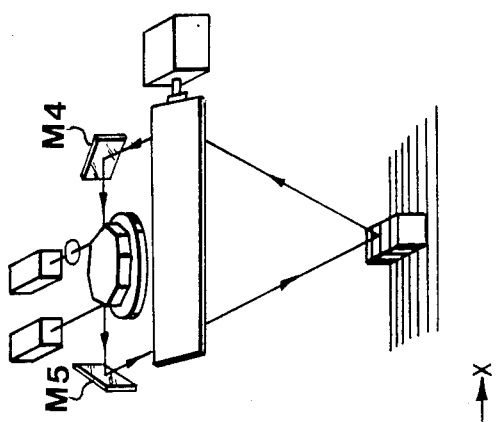
FIG. 5 is a schematic illustration of synchronous scanning according to still another embodiment to which the present invention can be applied.
Figure 4:
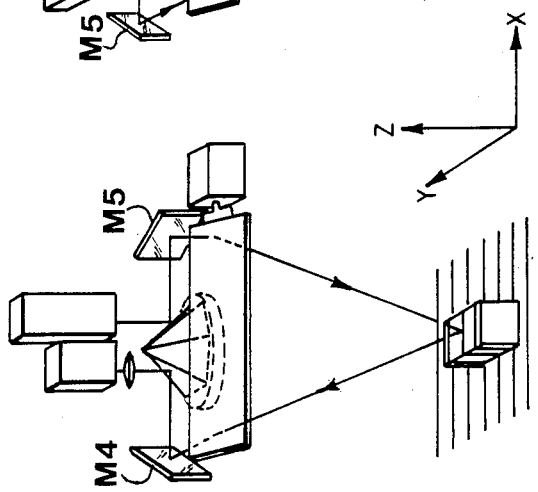
FIG. 4 is a schematic illustration of the synchronous scanning according to another embodiment to which the present invention can be applied.

The present invention can be adapted into various triangulation systems. However FIGS. 4, 5 and 6 illustrate schematically embodiments of synchronous scanning where the present invention can be adapted. Mirrors M4 and M5 of all of these figures can be replaced with cylindrical or spherical mirrors to suit the desired requirement of the reference plane.

I claim:

1. In an imaging device for determining the profile of a surface in a direction relative to a reference plane, a synchronous optical scanning apparatus, comprising:
   rotating scanning means including two or more rotating mirrors for synchronously scanning the surface along a scanning line by a scanning light beam and receiving a scanned beam scattered back from the surface; and
   a pair of reflecting mirrors, one in each of the optical paths of the scanning light beam and the scattered scanned beam;
   the invention being characterized in that
   the reflecting mirrors are curved.

2. The synchronous scanning apparatus according to claim 1 wherein:
   the shape of the reflecting mirrors is chosen so that the reference plane along the scanning line conforms to a predetermined form.

3. The synchronous scanning apparatus according to claim 2, wherein:
   the shape of the reflecting mirrors is selected from a group consisting of cylindrical and spherical.

4. The synchronous scanning apparatus according to claim 3 wherein:
   the predetermined form is a straight line.

5. The synchronous scanning apparatus according to claim 2 wherein:
   the said rotating scanning means is a double-sided mirror rotating about its axis.

6. The synchronous scanning apparatus according to claim 3, wherein:
   the said rotating scanning means is a double-sided mirror rotating about its axis.

7. The synchronous scanning apparatus according to claim 2, wherein:

the said rotating scanning means is multisided mirrors rotating about its axis.

8. The synchronous scanning apparatus according to claim 3, wherein:
the said rotating scanning means is multisided mirrors rotating about its axis.

9. The synchronous scanning apparatus according to claim 7, wherein:
the multisided mirrors are of a polygon or a pyramid.

10. The synchronous scanning apparatus according to claim 8, wherein:
the multisided mirrors are of a polygon or a pyramid.

* * * * *